(12) United States Patent
Song et al.

(10) Patent No.: US 8,873,176 B1
(45) Date of Patent: Oct. 28, 2014

(54) NON-LINEAR TRANSITION SHIFT IDENTIFICATION AND COMPENSATION

(71) Applicant: Marvell International Ltd., Hamilton (BM)

(72) Inventors: Hongwei Song, Longmont, CO (US); Ke Han, Fremont, CA (US); Michael Madden, Mountain View, CA (US); Zining Wu, Los Altos, CA (US)

(73) Assignee: Marvell International Ltd., Hamilton (BN)

( * ) Notice: Subject to any disclaimer, the term of this patent is extended or adjusted under 35 U.S.C. 154(b) by 0 days.

(21) Appl. No.: 13/745,069

(22) Filed: Jan. 18, 2013

Related U.S. Application Data

(60) Continuation of application No. 13/176,318, filed on Jul. 5, 2011, now Pat. No. 8,358,480, which is a division of application No. 11/784,482, filed on Apr. 6, 2007, now Pat. No. 7,974,032.

(60) Provisional application No. 60/790,877, filed on Apr. 11, 2006, provisional application No. 60/883,871, filed on Jan. 8, 2007.

(51) Int. Cl.
G11B 27/36 (2006.01)
G11B 5/035 (2006.01)
G11B 20/18 (2006.01)

(52) U.S. Cl.
CPC ................................. *G11B 20/18* (2013.01)
USPC .................................... 360/31; 360/65

(58) Field of Classification Search
None
See application file for complete search history.

(56) References Cited

U.S. PATENT DOCUMENTS

| | | | |
|---|---|---|---|
| 4,532,559 A | 7/1985 | Long et al. | |
| 5,469,462 A | 11/1995 | Kahlman et al. | |
| 6,208,477 B1 * | 3/2001 | Cloke et al. | 360/31 |
| 6,212,024 B1 | 4/2001 | Igarashi et al. | |
| 6,429,989 B1 * | 8/2002 | Schultz et al. | 360/51 |
| 7,158,324 B2 | 1/2007 | Stein et al. | |
| 2006/0002000 A1 * | 1/2006 | Schultz | 360/75 |

* cited by examiner

*Primary Examiner* — Daniell L Negron

(57) ABSTRACT

A system for identifying and compensating for non-linear transition shift in a magnetic medium data storage device is disclosed. The non-linear transition shift compensation system includes a non-linear transition shift estimation module adapted to generate non-linear transition shift estimates for specific bit patterns. The system further includes a pre-compensation module adapted to adjust the temporal spacing of binary transitions written to the magnetic medium based on the non-linear transition shift estimates generated by the non-linear transition shift estimation module for specific bit patterns corresponding to bit patterns appearing in the data being written to the magnetic medium.

18 Claims, 11 Drawing Sheets

| τ | $b_1$ | $b_1$ | $b_1$ | $b_1$ |
|---|---|---|---|---|
| A | 0 | 0 | 0 | 0 |
| B | 0 | 0 | 0 | 1 |
| C | 0 | 0 | 1 | 0 |
| D | 0 | 0 | 1 | 1 |
| E | 0 | 1 | 0 | 0 |
| F | 0 | 1 | 0 | 1 |
| G | 0 | 1 | 1 | 0 |
| H | 0 | 1 | 1 | 1 |
| I | 1 | 0 | 0 | 0 |
| J | 1 | 0 | 0 | 1 |
| K | 1 | 0 | 1 | 0 |
| L | 1 | 0 | 1 | 1 |
| M | 1 | 1 | 0 | 0 |
| N | 1 | 1 | 0 | 1 |
| O | 1 | 1 | 1 | 0 |
| P | 1 | 1 | 1 | 1 |

Fig. 7

| $b_{k-4}$ | $b_{k-3}$ | $b_{k-2}$ | $b_{k-1}$ | $b_k$ | $b_{k+1}$ | $b_{k+2}$ | $b_{k+3}$ | $b_{k+4}$ |
|---|---|---|---|---|---|---|---|---|
| 1 | 0 | 1 | 1 | 0 | 0 | 0 | 0 | 1 |

Fig. 8

NON-LINEAR TRANSITION SHIFT IDENTIFICATION AND COMPENSATION

RELATED APPLICATIONS

This application is a continuation application of U.S. Non-Provisional application Ser. No. 13/176,318, filed Jul. 5, 2011 (now U.S. Pat. No. 8,358,480), which is a divisional application of U.S. Non-Provisional application Ser. No. 11/784,482, filed Apr. 6, 2007 (now U.S. Pat. No. 7,974,032), which claims the benefit of U.S. Provisional Application No. 60/790,877, filed Apr. 11, 2006, and U.S. Provisional Application No. 60/883,871, filed Jan. 8, 2007. The contents of U.S. Non-Provisional application Ser. No. 13/176,318 (now U.S. Pat. No. 8,358,480), U.S. Non-Provisional application Ser. No. 11/784,482 (now U.S. Pat. No. 7,974,032), U.S. Provisional Application No. 60/790,877, and U.S. Provisional Application No. 60/883,871 are hereby incorporated by reference in their entirety.

BACKGROUND

1. Technical Field

The present disclosure relates to magnetic media data storage devices. More particularly, the disclosure relates to a system and method for identifying and compensating for non-linear transition shift in magnetic media data storage devices.

2. Related Art

Non-linear transition shift is a phenomenon that affects the timing of the binary transitions of data signals written to the magnetic media in magnetic media data storage devices. When the recording head of a magnetic media data storage device attempts to write a binary transition to the recording medium, the current transition is affected by the magnetic fields of previously written transitions. These magnetic fields can cause the current transition to be shifted in time such that the transition is written either earlier or later than intended. Such time shifts can be a source of noise leading to unacceptable bit error rates when data stored on the magnetic medium are subsequently read back and used by associated data processing equipment.

If the amount of non-linear transition shift affecting a particular binary transition is known in advance, it is possible to compensate for the shift when the transition is written to the magnetic recording medium. For example, if it is known that a particular transition will be delayed by 0.1 nanoseconds, it is possible to write the transition 0.1 nanoseconds earlier. When the timing of a transition is pre-compensated in this manner, the transition will occur precisely where intended when it is subsequently read from the recording medium. A problem, however, is that non-linear transition is inconsistent. The magnetic fields that cause non-linear transition shift depend on the sequence of bits near a particular binary transition. Thus, the amount and direction of non-linear transition shift experienced by a particular binary transition will be dependent on the particular data sequence being written to the magnetic storage medium.

A traditional approach to compensating for non-linear transition shift involves generating a pseudorandom sequence of binary data, writing the pseudorandom sequence to the magnetic recording medium, and reading it back. The recovered sequence is then analyzed to determine the effect that the various bit patterns in the pseudorandom sequence have had on the corresponding binary transitions recorded on the magnetic medium. This traditional approach suffers from a number of drawbacks. The main drawbacks of this approach are that it typically requires over-sampling of the waveforms, it is not very accurate, and only a limited number of data patterns may be specified for defining the associated NLTS values. Furthermore, the compensation values may not be refined over time under actual operating conditions. An improved approach is desirable.

BRIEF SUMMARY

The following embodiments relate to systems and methods of identifying and compensating for non-linear transition shift in binary transitions written to magnetic media data storage devices. It is noted that throughout the specification the term "data" may relate to a data carrying waveform (e.g., an analog signal carrying binary transition information) or a binary sequence of bits, depending on the component in the pipeline being discussed.

In the embodiments described below, non-linear transition shift is measured "on-the-fly" and non-linear transition shift pre-compensation values are continuously updated to ensure that the most accurate and up-to-date pre-compensation values are employed when writing data (an analog waveform transition) to the magnetic storage medium.

In one embodiment a system for identifying non-linear transition shift of a transition in a waveform is disclosed. The system includes a bit pattern identification module adapted to identify bit patterns in segments of a data sequence read from the magnetic storage medium. A non-linear transition shift value register bank stores a non-linear transition shift value for each bit pattern. Each non-linear transition shift value is either an estimate value or a fixed value. The non-linear transition shift estimate values are updatable by an algorithm implemented in the system. The non-linear transition shift fixed values are predetermined and unchangeable. The non-linear transition shift fixed values may be based upon one or more known characteristics of non-linear transition shift behavior. The various non-linear transition shift values stored in the non-linear transition shift value register bank are associated with specific bit patterns of finite length. Finally, the system includes a non-linear transition shift error estimation module for calculating a non-linear transition shift error estimate based on the non-linear transition shift values stored in the non-linear transition shift value register bank.

In another embodiment a magnetic media data storage device is disclosed. The magnetic media data storage device includes a magnetic medium and a magnetic read/write head for reading data from and writing data to the magnetic medium. A write channel prepares binary data to be written to the magnetic medium via the magnetic write head. A magnetic head/media channel generates a continuous-time analog waveform that corresponds to the data that was previously written to the magnetic medium, although the magnetic head/media channel (output) waveform may be corrupted by some noise. The magnetic media data storage device includes a non-linear transition shift identification module adapted to identify the non-linear transition shift of binary transitions (introduced during the write operation) in the waveform received from the magnetic head/media channel. A non-linear transition shift compensation module is adapted to temporally adjust when the binary transitions associated with specific bit patterns are written to the magnetic head/media channel. The adjusted timing of writing a binary transition to the magnetic head/media channel may be based on the actual non-linear transition shift identified by the non-linear transition shift identification module for a specific bit pattern.

In another embodiment a system for compensating for non-linear transition shift in a magnetic medium data storage device is disclosed. In this embodiment a non-linear transition shift compensation system includes a non-linear transition shift estimation module adapted to generate non-linear transition shift estimates for specific bit patterns. The system further includes a pre-compensation module adapted to adjust the temporal spacing of binary transitions written to the magnetic head/media channel. The amount of pre-compensation applied to a transition is based on a non-linear transition shift estimate generated by the non-linear transition shift estimation module. The non-linear transition shift estimate selected as a pre-compensation value depends on the specific bit pattern associated with the transition. Preferably, at least one bit pattern is associated with a non-linear transition shift value that is fixed, and therefore unchangeable by the non-linear transition shift estimation module.

A method of compensating for non-linear transition shift in a binary transition written to a magnetic data recording medium is also provided. The method includes defining a binary segment length. According to the method, non-linear transition shift values are provided for the various bit patterns that may be found in a binary segment of the defined binary segment length. Each non-linear transition shift value is either an estimate value or a fixed value. Binary data are read from the magnetic recording medium. The bit patterns in segments of the binary data read from the magnetic medium are identified. The non-linear transition shifts associated with binary transitions read from the magnetic medium is determined, and the corresponding bit pattern associated with each non-linear transition shift is identified. The actual non-linear transition shifts and their associated bit patterns are compared to the non-linear transition shift estimates generated for the corresponding bit patterns. The non-linear transition shift estimate values are adjusted based on the comparison. The time at which a binary transition associated with a particular bit pattern is written to the magnetic head/media channel is adjusted based on the non-linear transition shift estimates. The preferred embodiments will now be described with reference to the attached drawings.

BRIEF DESCRIPTION OF THE DRAWINGS

FIG. 7 is a table showing an example of non-linear transition shift values for all of the possible bit patterns of a 4-bit segment of a binary sequence.

FIG. 8 is a representative portion of a binary sequence.

DETAILED DESCRIPTION OF THE PRESENTLY PREFERRED EMBODIMENTS

The embodiments below relate to identifying non-linear transition shift (NLTS) that may occur when a binary transition is written to a magnetic data storage medium. The NLTS is identified in the read channel of a read/write magnetic data storage device and applied to data in the write channel of the device to pre-compensate for anticipated NLTS.

Figure 1:
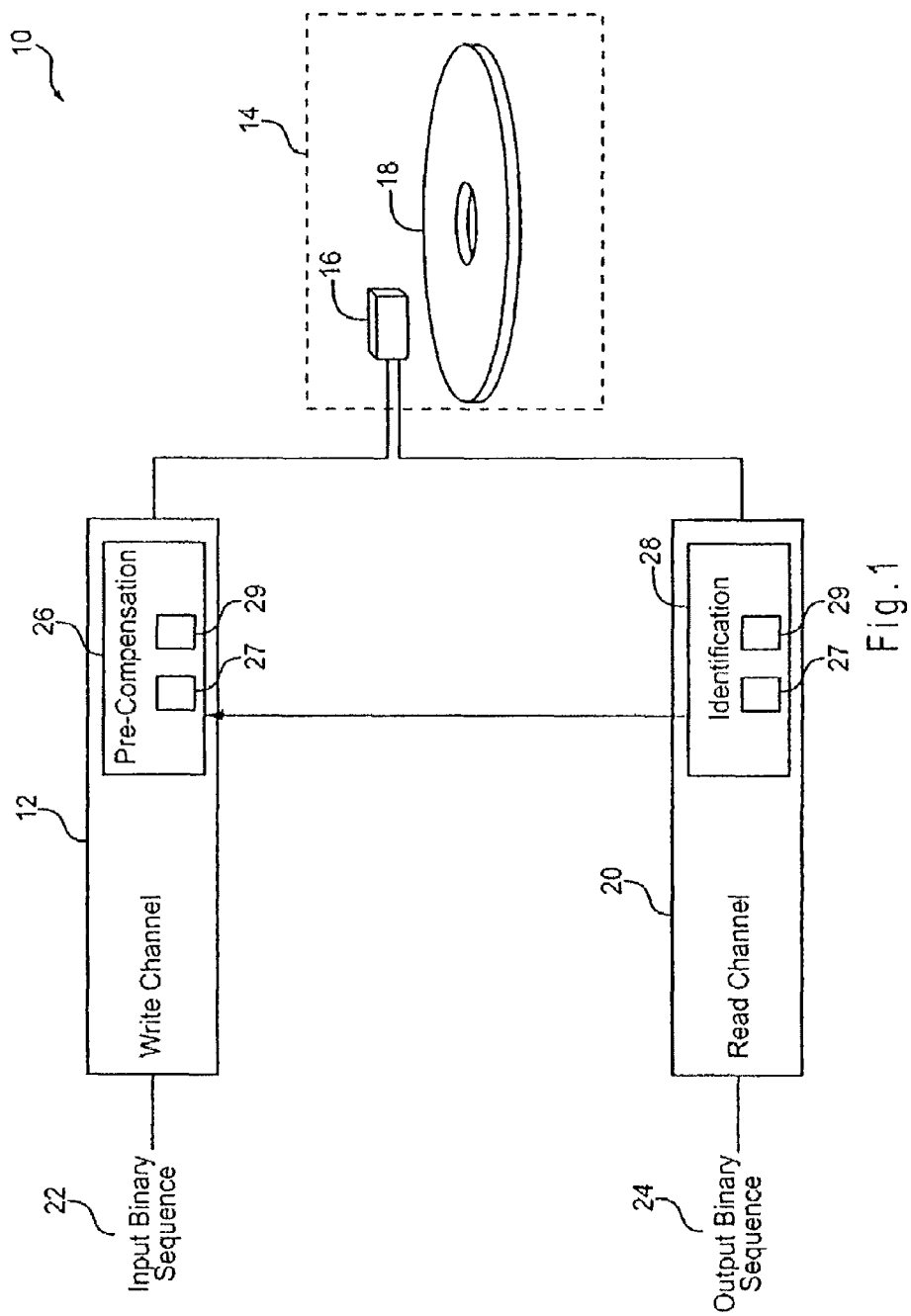
FIG. 1 is a simplified block diagram of a magnetic medium data storage device.

FIG. 1 is a simplified block diagram of a magnetic media data storage device 10 including NLTS identification and compensation. The magnetic data storage device 10 includes a write channel 12, a magnetic read/write head 16, a storage medium 18, and a read channel 20. The magnetic read/write head 16 may include a separate read head and a separate write head, or the two may be combined into a single read/write head as shown. The magnetic read/write head 16 and the storage medium 18 may be referred to in combination as a magnetic head/media channel 14.

The write channel 12 is adapted to receive user data in the form of input binary sequences 22 to be written to the magnetic read/write head 16 and stored on the storage medium 18. The read channel 20 receives a waveform from the magnetic head/media channel 14 corresponding to data retrieved from the storage medium 18 and outputs binary sequences 24.

The read channel 20 includes an NLTS identification block 28. The NLTS identification block 28 identifies NLTS in the waveform received from the magnetic head/media channel 14. Similarly, the write channel 12 includes an NLTS pre-compensation block 26. The information obtained by the NLTS identification block 28 may be provided to the NLTS pre-compensation block 26 so that the effects of NLTS may be reduced or eliminated by delaying or advancing the individual binary transitions written to the magnetic head/media channel 14.

Both the read channel NLTS identification block 28 and the write channel pre-compensation block 26 may include a processor 27, e.g. a central processing unit (CPU), and a memory 29, or have access to a processor 27 and memory 29. The memory 29 may be configured to store instructions that may be executed by the processor 27 for executing the NLTS identification and pre-compensation algorithms described below. The memory 29 may also be adapted to store parameters and variable data associated with identifying and compensating for NLTS. Both the NLTS pre-compensation block 26 and the NLTS identification block 28 may employ their own processor 27 and memory 29, or they may share a common processor 27 and memory 29. Alternatively, one or both of the NLTS identification block 28 and the pre-compensation block 26 may access a remote processor 27 and memory 29. In alternative embodiments, dedicated hardware implementations, such as application specific integrated circuits, programmable logic arrays and other hardware devices, may be constructed to implement one or more of the NLTS identification and compensation algorithms described herein. Accordingly, the present system encompasses software, firmware, and hardware implementations or a combination thereof.

NLTS is bit pattern specific. The amount and direction of NLTS for a particular transition depends on the sequence of bits near the transition. The NLTS identification block 28 identifies the amount and direction of NLTS associated with individual transitions and the particular bit patterns near them. The NLTS pre-compensation block 26 adjusts the timing of a transition written to the magnetic head/media channel 14 by an amount and in a direction necessary to compensate for anticipated NLTS based on the bit pattern of the binary sequence near the transition. The pre-compensation combines with the actual NLTS such that NLTS error is substantially reduced or eliminated.

Figure 2:
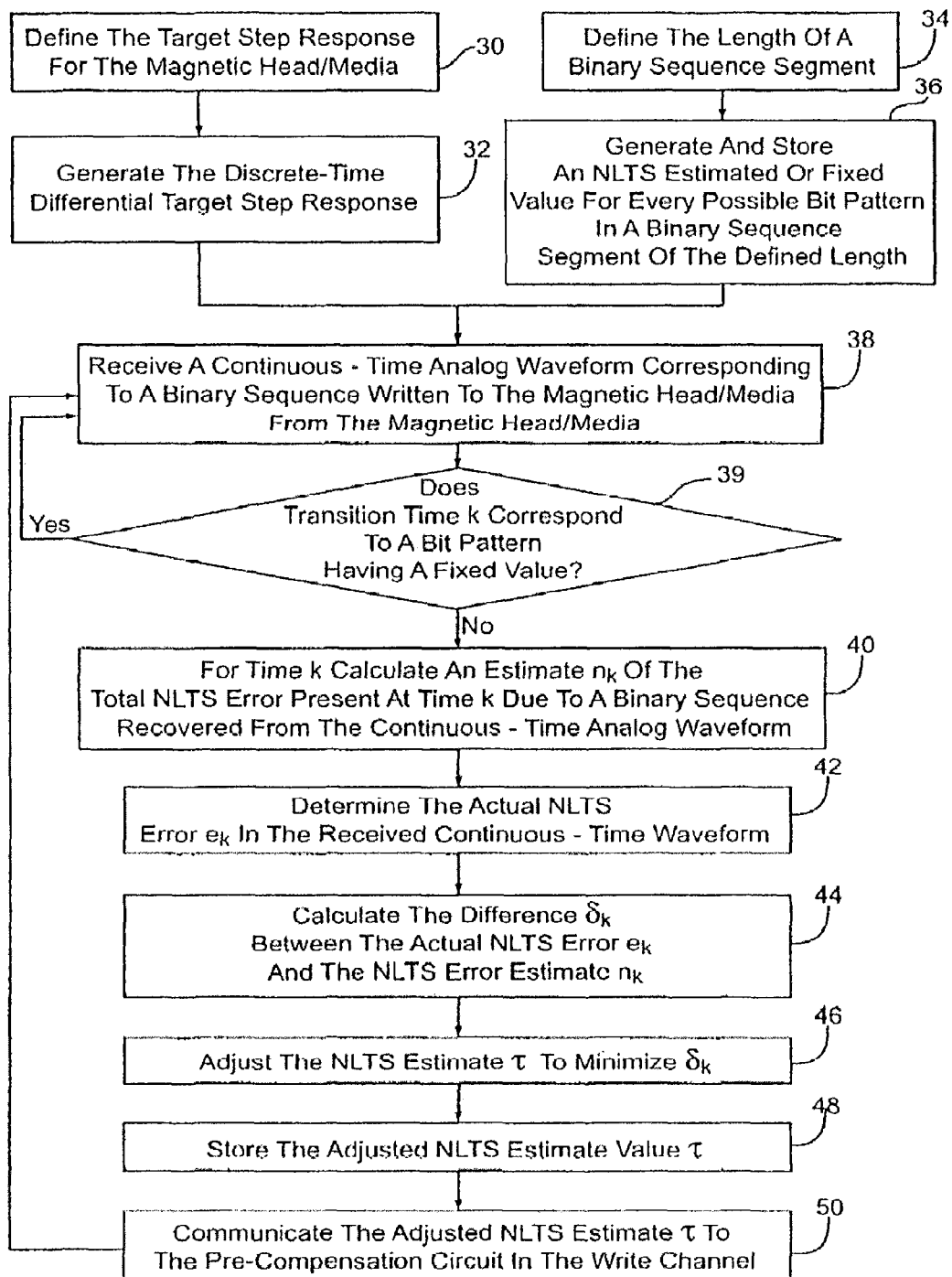
FIG. 2 is a flowchart illustrating a method of identifying non-linear transition shift in a data sequence read from a magnetic storage medium.
Figure 3:
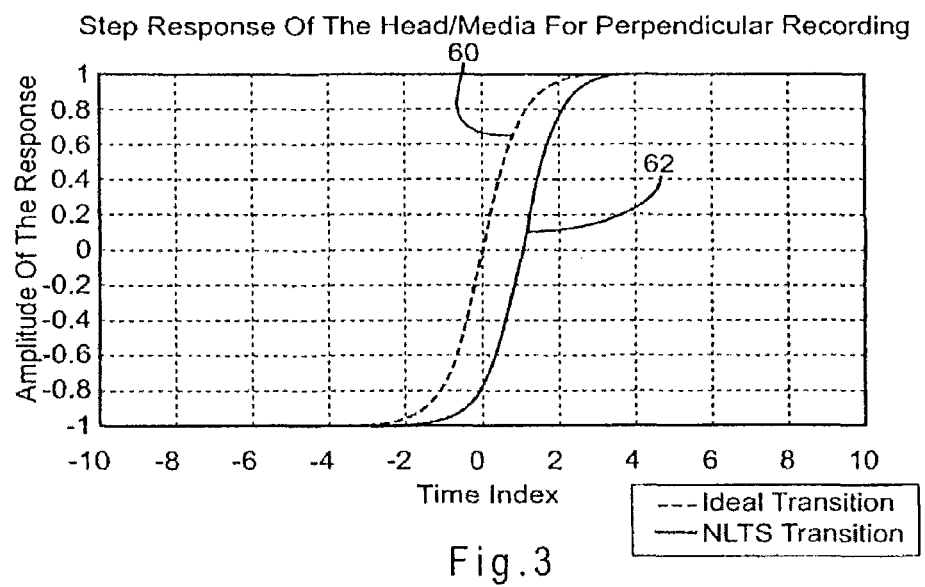
FIG. 3 is a continuous-time plot of the magnetic head/media channel step response of an ideal binary transition and a binary transition subject to non-linear transition shift.

The NLTS identification block 28 employs an algorithm for identifying NLTS "on-the-fly" as a waveform is received from the magnetic head/media channel 14. FIG. 2 is a flowchart outlining the NLTS identification process. A first preliminary step 30 is to define the target (ideal) step response for the magnetic head/media channel 14. FIG. 3 shows the continuous-time step response 60 for an ideal binary transition occurring at time 0. FIG. 3 also shows the continuous-time step response 62 for a binary transition subject to an NLTS. The continuous-time NLTS step response 62 is substantially identical to the continuous-time ideal step response 60, but translated in time by an amount τ. For a particular transition, the pattern of bits near the transition will determine the magnitude and direction of the NLTS shift τ.

Figure 4:
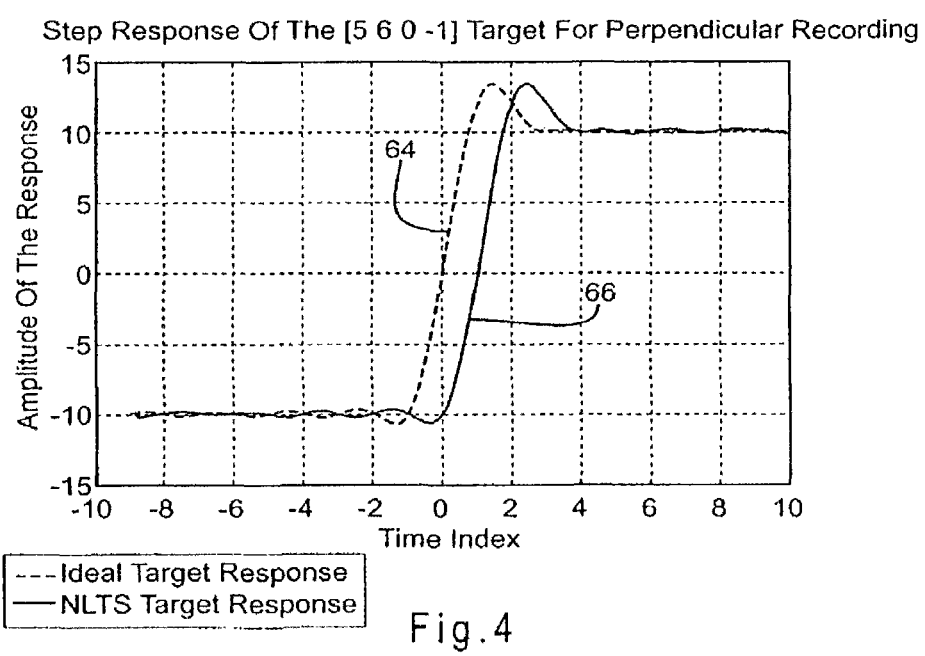
FIG. 4 is a continuous-time plot of the equalized target step response of an ideal binary transition and a binary transition subject to non-linear transition shift.

Typically the read channel 20 of a magnetic data storage device will equalize the data signal received from the magnetic head/media channel 14 so that the magnetic head/media channel 14 transfer function will conform to a desired target polynomial. FIG. 4 shows the equalized continuous-time step response 64 for the continuous-time ideal step response 60, and the equalized continuous-time step response 66 for the continuous-time NLTS step response 62. Again, the equalized continuous-time NLTS step response 66 has substantially the same shape as the equalized continuous-time ideal step response 64 but is translated in time by the amount τ.

The equalized continuous-time ideal step response 64 may be represented as a function TS(t). The equalized continuous-time NLTS step response 66 may be represented by the function TS(t+τ). The difference between the equalized continuous-time ideal step response 64 and the equalized continuous-time NLTS step response 66 may be determined by the equation $$DTS(t) = TS(t+\tau) - TS(t) \quad [1]$$

For sufficiently small values of τ the difference DTS(t) may be approximated as $$DTS(t) \approx \frac{dTs}{dt} \cdot \tau = dts(t), \text{ where } dts(t) = \frac{dTS(t)}{dt} \quad [2]$$

The term dts(t) is simply the time derivative of the equalized continuous-time ideal step response 64 of a transition at time 0 (the target response). Equation [2] says that, for small values of τ, the difference between the equalized continuous-time NLTS step response 66 and the equalized continuous-time ideal step response 64, the error introduced by the NLTS shift, is approximately equal to the time derivative of the equalized continuous-time ideal step response 64 multiplied by the amount of the shift. This relationship is employed by the NLTS identification algorithm in the NLTS identification block 28 to estimate the NLTS error in the waveform received from the magnetic head/media channel 14.

Figure 5:
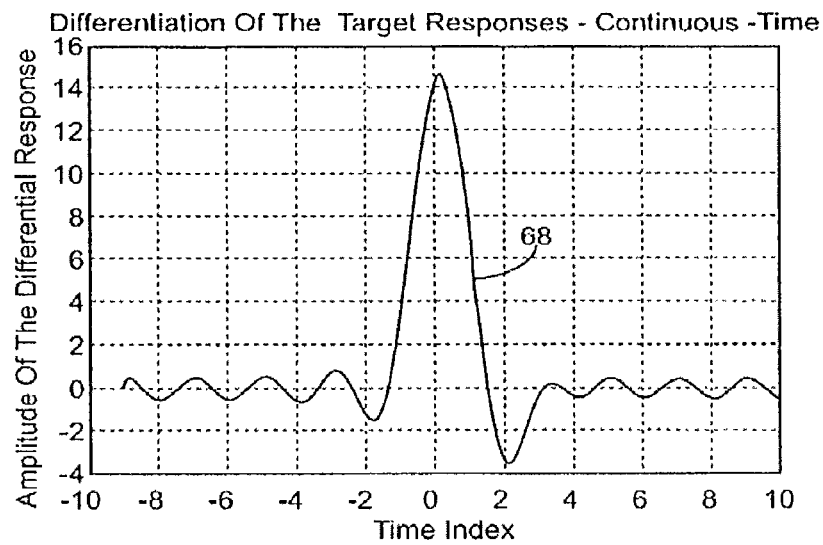
FIG. 5 is a continuous-time plot of the differentiated target step response shown in FIG. 4.
Figure 6:
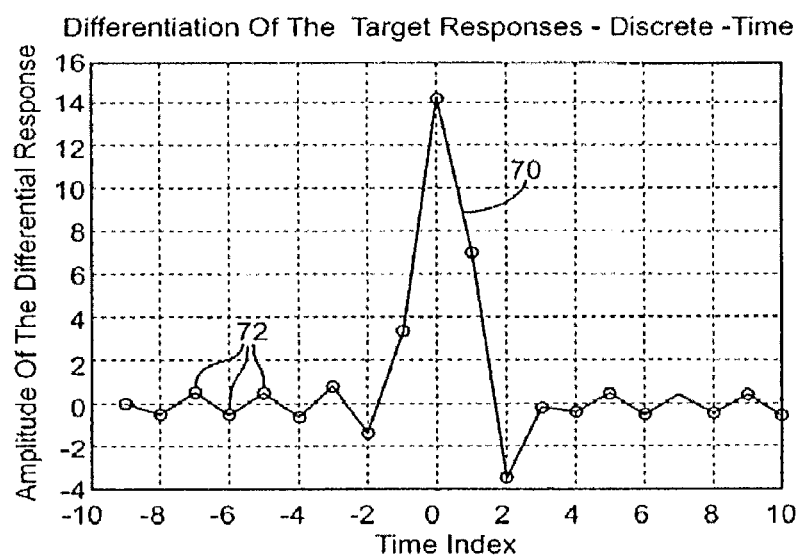
FIG. 6 is a discrete-time plot of the differentiated target step response shown in FIG. 4.

The next step in the NLTS identification process calls for generating the discrete-time differential ideal step response 32. The continuous-time differential ideal step response dts(t) is not dependent on the sequence of bits read from the head/media channel 14 and may be calculated directly from the equalized continuous-time ideal step response 64 (TS(t)). FIG. 5 shows the continuous time differentiation 68 of the equalized continuous-time ideal step response 64 of FIG. 4. The discrete-time differentiation of the ideal step response may be obtained by sampling the continuous time differentiation 68 at regular intervals over a predefined window of time. FIG. 6 shows the discrete-time differentiation 70 of the equalized continuous-time ideal step response 64 of FIG. 4. The discrete-time differentiation 70 comprises a plurality of discrete data points 72 corresponding to the values of the continuous-time differentiation 68 of the equalized continuous-time ideal step response 64 at specific instances of time.

As has been mentioned, NLTS is determined by the specific bit pattern of the binary sequence in the vicinity of a particular binary transition. The influence a particular bit has on a specific transition diminishes with its physical and temporal distance from the transition. In other words, those bits within a binary sequence that are nearest a transition will have the greatest impact on any NLTS shift experienced by the transition. Those bits further away from the transition will have less impact. At some point, the impact of bits further away from a transition become negligible. Accordingly, another preliminary step in the NLTS identification process is to define the length of a binary sequence segment 34 that will be considered when identifying and compensating for NLTS. As will be described in more detail below, a parameter d may be defined such that a bit sequence d+1 bits long will be considered for identifying and compensating for NLTS. In most cases a value of d in the range of 3-5 will be appropriate, although other values may be applied as well.

The length of the binary sequence defined by the parameter d determines the resolution of the NLTS identification process. Because the amount of NLTS shift experienced by a binary transition is dependent on the pattern of the waveform in the vicinity of the transition, the number of NLTS gradations that may be identified is determined by the number of bits in the binary sequence whose impact is considered on NLTS. Consider a situation where a two bit segment of a binary sequence is employed for identifying NLTS. This is another way of saying that the total amount of NLTS shift experienced by a binary transition is determined by a two bit segment of a binary sequence. A two bit segment can generate four distinct bit patterns:

00
01
10
11

Because NLTS is dependent on the bit pattern near a binary transition, any amount of NLTS shift experienced by a binary transition must be ascribed to one of these four bit patterns. Obviously increasing the length of the binary segment will increase the NLTS identification resolution. A three bit segment can generate 8 distinct bit patterns, a four bit sequence can generate 16 bit patterns, and so forth, doubling the resolution with each additional bit.

A final preliminary step 36 in the NLTS identification process is to generate estimates for the amount of NLTS shift τ associated with bit patterns in a binary segment of the length defined at step 34. For example, FIG. 7 is a table 74 showing NLTS shift values τ for every possible bit pattern of a four bit binary segment (d=3). Some NLTS shift values may be estimated values that can be updated and some NLTS shift values may be fixed values. For example, in FIG. 7 the bit pattern 0000 may correspond to a fixed amount of NLTS shift τ=A; the bit pattern 0001 may initially correspond to an estimated amount of NLTS shift τ=B, and so forth. Initially, the various NLTS shift estimated values need not be particularly accurate, as they will be adaptively adjusted later in the process. The fixed NLTS shift values are based upon known properties of a particular bit pattern, are assumed to be accurate, and are not adjusted.

Once the discrete-time differentiated ideal step response has been generated and NLTS shift estimated and/or fixed values have been determined and stored for the various bit patterns that may be encountered in the d+1 bit long segments of a binary sequence, a continuous-time analog waveform corresponding to a binary sequence written to the magnetic head/media channel 14 is received from the magnetic head/media channel 14 at step 38. FIG. 8 shows a sample binary segment 76 corresponding to a continuous-time analog waveform received from the magnetic head/media channel 14. The binary segment 76 is centered around a time k. The binary segment 76 includes the bit $b_k$ received at time k, the four bits $b_{k-1}$, $b_{k-2}$, $b_{k-3}$, and $b_{k-4}$ preceding $b_k$, and the four bits immediately following $b_k$, $b_{k+1}$, $b_{k+2}$, $b_{k+3}$, and $b_{k+4}$. In FIG. 8, the binary segment 76 has the bit pattern 101100001.

The next step 40 in the NLTS identification process is to calculate an estimate $n_k$ of the total NLTS error present in a signal received from the magnetic head/media channel 14 at a given time k, provided that the bit pattern surrounding k does not correspond to an NLTS fixed value (step 39).

An estimate of the total NLTS error $n_k$ for a particular time is based upon the binary transition that occurs at that particular time as well as neighboring transitions. In other words, the total NLTS error at a particular time k is equal to the sum of the NLTS error contribution from the transition at time k plus the NLTS error contributions of several neighboring transitions. This phenomenon is best understood graphically.

Figure 9:
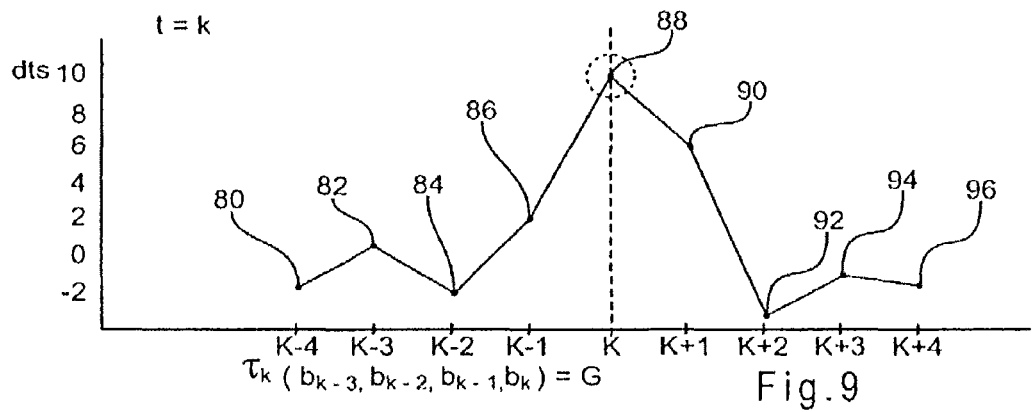
FIG. 9 is a discrete time plot of the differentiated target step response of a binary transition occurring at a time k.

Recall that FIG. 6 shows the discrete-time differentiation 70 of the ideal step response for the magnetic head/media channel 14 for a binary transition occurring at time t=0. FIG. 9 shows the discrete-time differentiation of the ideal step response for the magnetic head/media channel 14 for a transition occurring at time t=k. The two curves are substantially identical except that the curve in FIG. 9 has been translated in time and is centered around t=k rather than t=0. From Equation [2] the NLTS error due to the transition at time k is given by $$DTS(t)=dts(t)\cdot\tau$$

In the discrete time domain Equation [2] may be restated as $$DTS_i=dts_i\cdot\tau$$

Where i is a sampling index identifying the various data points 80, 82, . . . 96 of the discrete time differentiation of the ideal step response of the magnetic head/media channel 14 for a transition at time k. τ is a function of the bit pattern in a segment of the received binary sequence ($b_{k-d}$, $b_{k-d+1}$, . . . , $b_k$). In the example given earlier, the parameter d was assigned a value d=3. Thus, τ for the transition occurring at time k is a function of the bit pattern of the segment of the received binary sequence ($b_{k-3}$, $b_{k-2}$, $b_{k-1}$, $b_k$). Referring to FIG. 8, τ($b_{k-3}$, $b_{k-2}$, $b_{k-1}$, $b_k$)=τ(0110). Referring to the table in FIG. 7, τ(0110) corresponds to an NLTS shift τ(0110)=G. The NLTS error caused by the binary transition at time k is approximately equal to the discrete-time differentiated ideal step response for a binary transition occurring at time k times τ(0110), or $dts_{88} \cdot G$. Graphically this means multiplying each data point 80, 82 . . . 96 of the discrete-time differentiation of the ideal step response for the binary transition at time k by an amount G. As is quite clear from FIG. 9, the NLTS shift of the binary transition at time k based on the bit pattern 0110 will cause NLTS error at times other than time k. For example, at time k+1 the NLTS of a binary transition at time k will cause NLTS shift error equal to the value 90 of the discrete-time differentiated ideal step response at time k+1 times G. Similarly, at time k−1 the NLTS of the binary transition at time k will cause NLTS shift error equal to the discrete-time value 86 of the differentiated ideal step response at k−1 times G.

Figure 10:
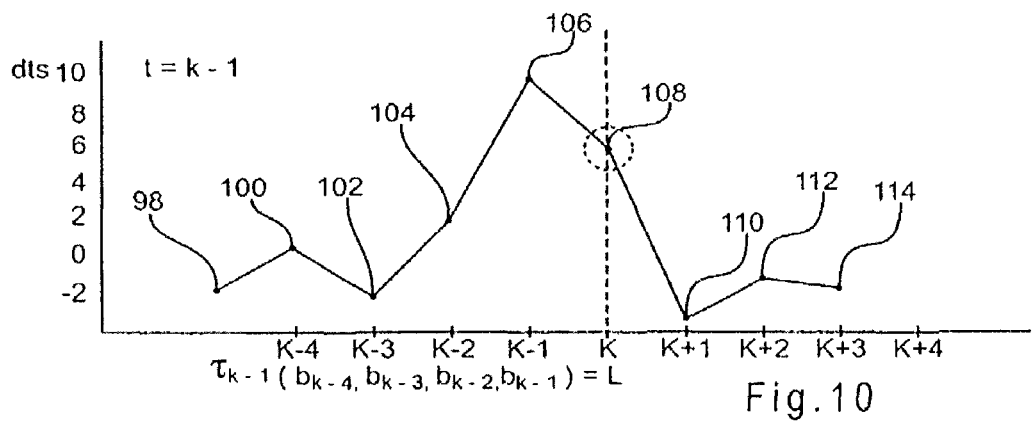
FIG. 10 is a discrete time plot of the differentiated target step response of a binary transition occurring at a time k−1.

Just as the NLTS shift incurred by the binary transition at time k causes residual NLTS error at times other than time k, the NLTS shift of binary transitions occurring at times other than time k will similarly cause residual NLTS error at time k. For example, FIG. 10 shows the discrete-time differentiation of the ideal step response for the magnetic head/media channel 14 for a binary transition occurring at a time k−1. τ for the transition shift occurring at k−1 is a function of the bit pattern of the received binary sequence segment ($b_{k-4}$, $b_{k-3}$, $b_{k-2}$, $b_{k-1}$). Referring to FIG. 8, τ($b_{k-4}$, $b_{k-3}$, $b_{k-2}$, $b_{k-1}$)=τ(1011). Referring to the table in FIG. 7, τ(1011)=L. The NLTS error caused by the binary transition at time k−1 is approximately equal to $dts_i \cdot \tau(1011) = dts_i \cdot L$. Graphically this corresponds to multiplying each discrete value 98, 100, . . . 114 of the discrete-time differentiated ideal step response of the binary transition occurring at time k−1 by an amount L. As can be seen in FIG. 10, the NLTS shift of the binary transition at time k−1 will generate NLTS error at time k in an amount equal to the discrete value 108 of the discrete time differentiated ideal step response for the binary transition occurring at time k−1 times L, or $dts_{108} \cdot L$.

Figure 11:
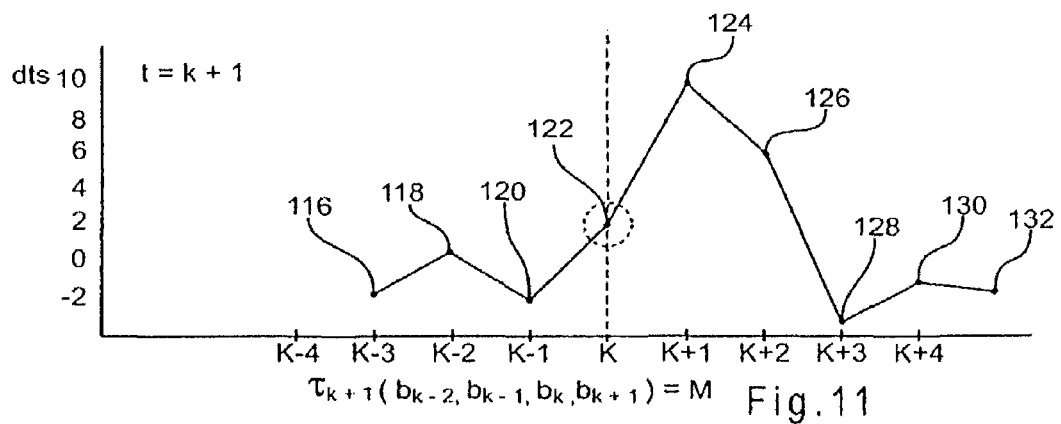
FIG. 11 is a discrete time plot of the differentiated target step response of a binary transition occurring at a time k+1.

Similarly, FIG. 11 shows the discrete-time differentiation of the ideal step response for the magnetic head/media channel 14 for a binary transition occurring at time k+1. τ for the transition occurring at k+1 is a function of the bit pattern of the received binary sequence segment ($b_{k-2}$, $b_{k-1}$, $b_k$, $b_{k+1}$). Referring to FIG. 8, τ($b_{k-2}$, $b_{k-1}$, $b_k$, $b_{k+1}$)=τ(1100). Referring to the table in FIG. 7, τ(1100)=M. The NLTS error caused by the binary transition at time k+1 is approximately equal to $dts_i \cdot \tau(1100) = dts_i \cdot M$. Graphically this corresponds to multiplying each discrete value 116, 118, . . . , 130 of the discrete-time differentiated ideal step response of the binary transition occurring at time k+1 by an amount M. As can be seen in FIG. 11, the NLTS shift of the binary transition at time k+1 will generate NLTS error at time k in an amount equal to the discrete value 122 of the discrete-time differentiated ideal step response for the binary transition occurring at time k+1 times M, or $dts_{122} \cdot M$.

The total NLTS error at time k resulting from the NLTS shift experienced by the binary transitions occurring at times k−1, k, and k+1 is equal to the sum of the NLTS error at time k from each transition, or $$n_k = dts_{108} \cdot L + dts_{88} \cdot G + dts_{122} \cdot M.$$

The discrete-time differentiated ideal step response is the same for each binary transition in the sequence, only translated in time. Thus, the discrete values of discrete-time differentiated step response of a transition at time 0 (FIG. 6) may be applied to the calculation of the NLTS error estimate at other times. A time window may be defined where −M≤i≤+N. The time window may be symmetrical about the time τ=0 such that N=M and −M≤i≤+M. The estimate of the total NLTS error at a given time k anywhere in the read back waveform may be given by $$n_k = \sum_{i=-M}^{+M} dts_i \cdot \tau_{k-i}(b_{k-i-d}, b_{k-i-d+1}, \odot\odot\odot, b_{k-i}). \quad [3]$$

Returning to the flowchart of FIG. 2, once the NLTS error estimate is calculated for time k, the next step 42 is to determine the actual NLTS error $e_k$ in the read back waveform. The NLTS error $e_k$ may be obtained by subtracting an equalized waveform from a reconstructed ideal waveform created based on the most likely bit sequence corresponding to the received waveform. The NLTS error $e_k$ can be compared to the estimated NLTS error $n_k$ to determine the accuracy of the estimate. A difference function $\delta_K$ may be defined as $$\delta_k = e_k - n_k = e_k - \sum_{i=-M}^{+M} dts_i \cdot \tau_{k-i}(b_{k-i-d}, b_{k-i-d+1}, \odot\odot\odot, b_{k-i}). \quad [4]$$

Ideally $|\delta_K|$ will be as small as possible. In other words, the estimated NLTS error $n_K$ will be close or equal to the actual NLTS error $e_k$ in the waveform received from the magnetic head/media channel 14. Recall that the original values of $\tau(b_1, b_2, b_3, b_4)$ in the table 74 of FIG. 7 were either estimated or fixed values. The estimated values may be adjusted to minimize $\delta_K$ as indicated at step 46 of the NLTS identification process.

In one embodiment, the value of $\tau$ (FIG. 7) may be fixed to a predetermined value(s) for one or more selected binary sequences. A predetermined value may be based upon one or more known characteristics of NLTS behavior. For example, the value for $\tau(0,0,0,0)$ may be fixed such that A=0 (FIG. 7) if it is known that a succession of four bits without transition does not cause NLTS for a fifth bit having a transition.

For the values of $\tau$ that are adjustable, minimization of $\delta_K$ may be accomplished using the least mean squared algorithm. A new function c may be defined as $$c = \delta_k^2 = (e_k - n_k)^2 = \left( e_k - \sum_{i=-M}^{N} dts_i \cdot \tau_{k-i}(b_{k-i-d}, b_{k-i-d+1}, \ldots, b_{k-i}) \right)^2 \quad [5]$$

The gradient of C may be calculated as $$\frac{\partial c}{\partial \tau_{k-i}} = -2 \cdot \delta_k \cdot dts_i. \quad [6]$$

The identity index of $\tau_{k-1}$ is $(b_{k-i-d}, b_{k-i-d+1}, \ldots, b_{k-i})$. The time index k−i is the location where the binary transition with which $\tau_{k-i}$ is associated occurs. The identity index is limited by $[0, 2^{d+1}-1]$. The NLTS values can be adaptively obtained by $$\tau_{h+1}{}^j = \tau_h{}^j + \mu \cdot \delta_k \cdot dts_i; \text{ where } j = f(b_{k-i-d}, b_{k-i-d+1}, \ldots b_{k-i}) \quad [7]$$

The variable μ defines the size of an incremental adjustment step, and the sign of $\delta_k$ determines the direction of adjustment. The new values for $\tau_{k-i}(b_{k-i-d}, b_{k-i-d+1}, \ldots, b_{k-i})$ are stored in an NLTS value register bank. In other words, the adjustable $\tau$ values stored in table 74 of FIG. 7 may be replaced with the adjusted $\tau$ values at step 488. The adjusted values are communicated to the pre-compensation block 26 in the write channel 12 at step 50.

The steps 38-50 of the NLTS identification process in FIG. 2 may be repeated for each binary transition in the received waveform. Over time the adjusted NLTS estimates become more and more accurate and the difference $\delta_K$ between the actual NLTS error $e_k$ and the estimated NLTS error $n_k$ becomes smaller and smaller.

The pre-compensation block 26 in the write channel 12 may use the values of $\tau(b_{k-i-d}, b_{k-i-d+1}, \ldots b_{k-i})$ stored in the NLTS value register bank to adjust the timing of binary transitions written to the head/media channel 14. For example, assume the values in table 74 of the FIG. 7 have been adjusted, and the pre-compensation block 26 identifies the bit sequence $(b_{k-3}, b_{k-1}, b_{k-1}, b_k)$=0100. The estimated value of $\tau$ is E. In other words, it is estimated that the binary transition will be shifted by an amount E (in light of the bit pattern $(b_{k-3}, b_{k-1}, b_{k-1}, b_k)$=0100) when it is written to the storage medium 18. The pre-compensation block 26 may alter the timing of the transition at time k by an amount −E. The pre-compensation amount −E will combine with the NLTS shift amount E to cancel-out the NLTS shift and the transition will occur at the proper time k when the transition is written to the storage medium.

Figure 12:
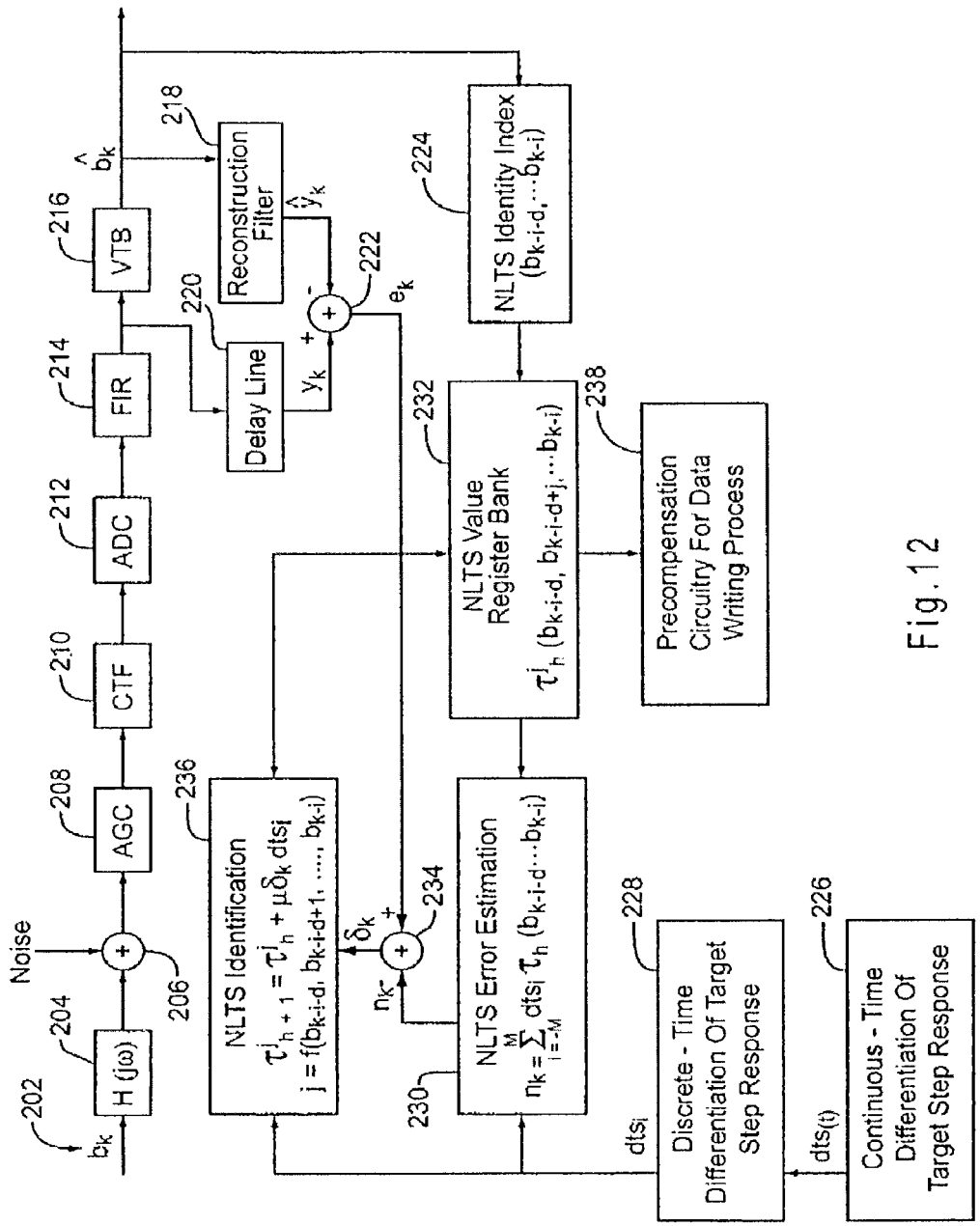
FIG. 12 is a block diagram of the read channel, including the read/write head, of a magnetic medium data storage device.

FIG. 12 is a block diagram of a preferred embodiment of a magnetic data storage device read channel implementing the NLTS identification process described above. User data $b_k$ 202 are written to the magnetic head/media channel 204. The magnetic head/media channel 204 is characterized by the transfer function H(jω). White gaussian system noise is added at 206. The read channel 20 includes automatic gain control (AGC) 208; a continuous time filter (CTF) 210; an analog-to-digital converter (ADC) 212; and a finite impulse response filter (FIR) 214. The output of the FIR filter 214 is input to a Viterbi detector (VTB) 216, and a delay line 220. The VTB detector 216 outputs a binary signal $\hat{b}_k$ which is a high reliability estimate of the original user data signal $b_k$ 202 written to the magnetic head/media channel 204. The output $\hat{b}_k$ of the VTB detector 216 is input to a reconstruction filter 218 and an NLTS identity index module 224. The NLTS identity index module 224 identifies the bit patterns of finite segments of binary sequence $\hat{b}_k$ output from the VTB detector 216. The reconstruction filter 218 generates the ideal waveform $\hat{y}_k$ from the binary sequence $\hat{b}_k$ based on the target polynomial of the read channel. The ideal waveform $\hat{y}_k$ is subtracted from the output of the FIR filter 214 $y_k$ at summing junction 222. The output of the FIR filter 214, is delayed by delay line 220 in order to maintain synchronization with the output of the reconstruction filter 218. The difference between $y_k$ and $\hat{y}_k$ provides the error signal $e_k$.

The target polynomial dst(t) is provided at 226 and the discrete-time differentiation of the target (ideal) step response is calculated at 228. The discrete-time differentiation of the target step response $dts_i$ is provided to an NLTS error estimation module 230, and an NLTS identification module 236. When a waveform is received from the magnetic head/media channel 204, and the VTB detector 216 outputs the most likely binary sequence $\hat{b}_k$ corresponding to the received waveform, the NLTS identity index module 224 identifies the bit pattern in each successive segment of the binary sequence. The length of the bit patterns identified by the NLTS identify index module 224 is determined by the value of the parameter d. The binary segment length being equal to d+1. The bit patterns identified by the NLTS identity index module 224 are used to identify values for the NLTS shift estimate. Each value of the NLTS shift estimate τ is a function of the preceding bit pattern $(\tau_{k-i})(b_{k-i-d}, b_{k-i-d+1}, \ldots, b_{k-i})$. An NLTS value register bank 232 identifies the appropriate value of τ for each successive binary segment. The τ values are provided to the NLTS estimation module 230, as well as to the pre-compensation circuitry 238 in the write channel. The τ values provided to the NLTS error estimation module 230 are used to calculate the NLTS error estimate $n_k$ for the binary transitions in the received waveform. The NLTS estimate $n_k$ is subtracted from the error signal $e_k$ at summing junction 234 to produce the difference signal $\delta_k$. $\delta_k$ is provided to the NLTS identification module 236 along with the discrete-time differentiation of the target step response 228. The NLTS identification module 236 adjusts the values of τ as described above in an effort to reduce the magnitude of $\delta_k$. The adjusted values of τ are then stored in the NLTS value register bank 232, replacing the previous estimates corresponding to the various bit patterns generated by the binary segments of length d+1. Thus, the NLTS values that are not fixed are continually refined, and improved NLTS values are provided to the pre-compensation circuitry 238 so that the write channel can compensate for expected NLTS shift when it writes data to the magnetic head/media channel 14.

In various embodiments, two or more of the modules and/or blocks shown in FIG. 12 or discussed herein may be physically and/or functionally combined. Any one or combination of modules and/or blocks may be referred to in general as an NLTS module. Module is not to be regarded as a limiting term but rather as a term encompassing any type of device, circuit, component, or element to perform at least the function discussed in relation thereto.

Figure 13A:
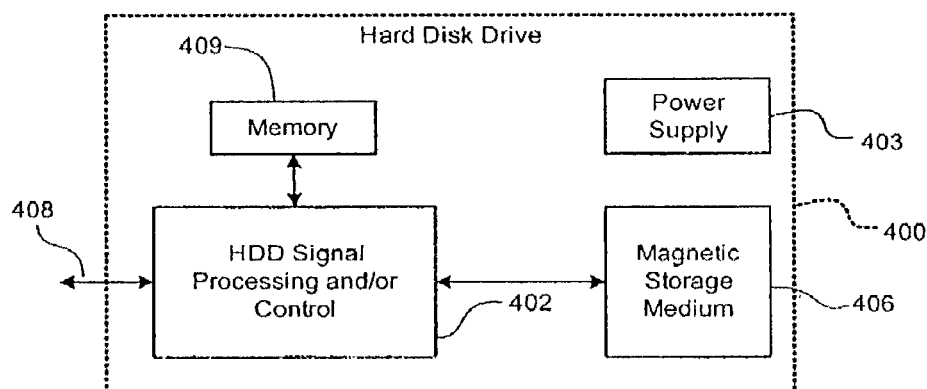
FIG. 13A is a functional block diagram of a hard disk drive.

Referring now to FIGS. 13A-13G, various exemplary implementations of the present invention are shown. Referring now to FIG. 13A, the present invention can be implemented in a hard disk drive 400. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Figure 13B:
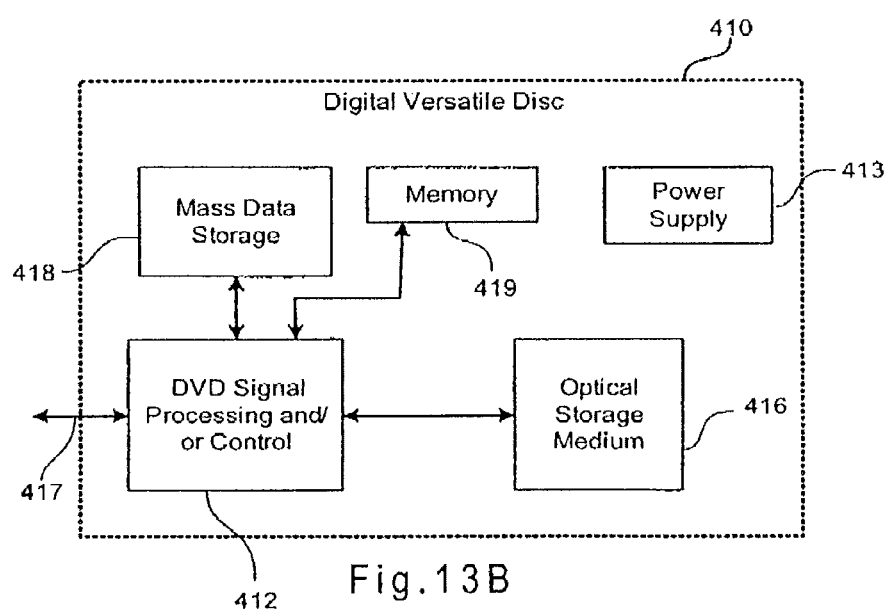
FIG. 13B is a functional block diagram of a digital versatile disk (DVD)

Referring now to FIG. 13B, the present invention can be implemented in a digital versatile disc (DVD) drive 410. For example, the present invention may be implemented on a mass data storage device of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with the mass data storage 418, which stores data in a nonvolatile manner. The mass data storage 418 may include a hard disk drive (HDD). The HDD may have the configuration shown in FIG. 13A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 13C:
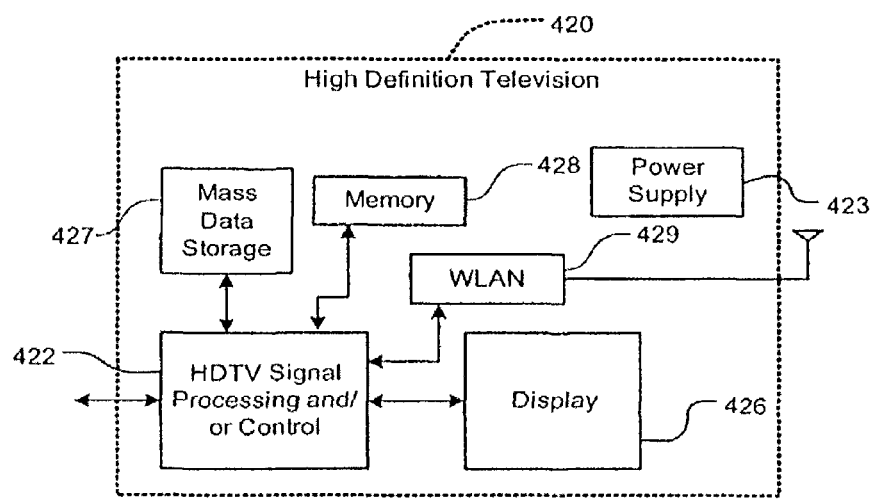
FIG. 13C is a functional block diagram of a high definition television.

Referring now to FIG. 13C, the present invention can be implemented in a high definition television (HDTV) 420. For example, the invention may be implemented on a mass data storage of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with the mass data storage 427 that stores data in a nonvolatile manner such as on a magnetic storage devices. At least one HDD may have the configuration shown in FIG. 13A and/or at least one DVD may have the configuration shown in FIG. 13B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 13D:
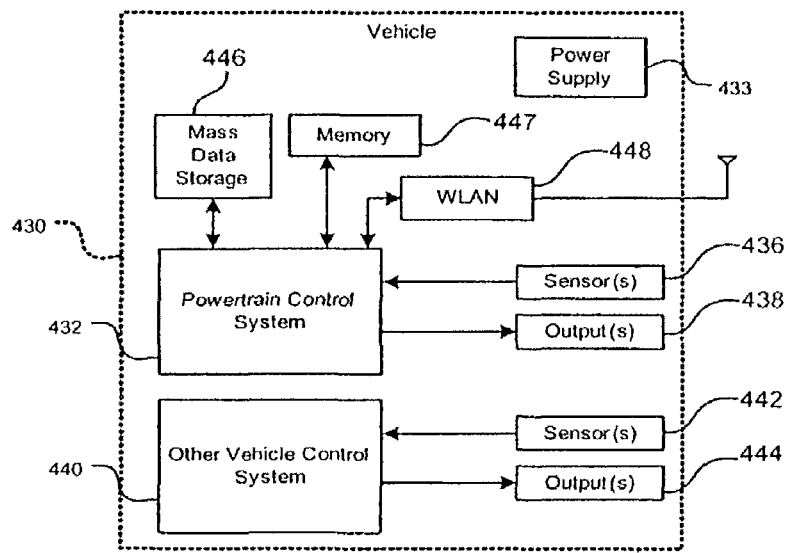
FIG. 13D is a functional block diagram of a vehicle control system.

Referring now to FIG. 13D, the present invention may be implemented in a mass data storage device of a vehicle control system. In some implementations, a powertrain control system 432 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in relation to other control systems 440 of the vehicle 430. For example, the control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include magnetic storage devices such as hard disk drives HDD. At least one HDD may have the configuration shown in FIG. 13A and/or at least one DVD may have the configuration shown in FIG. 13B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 13E:
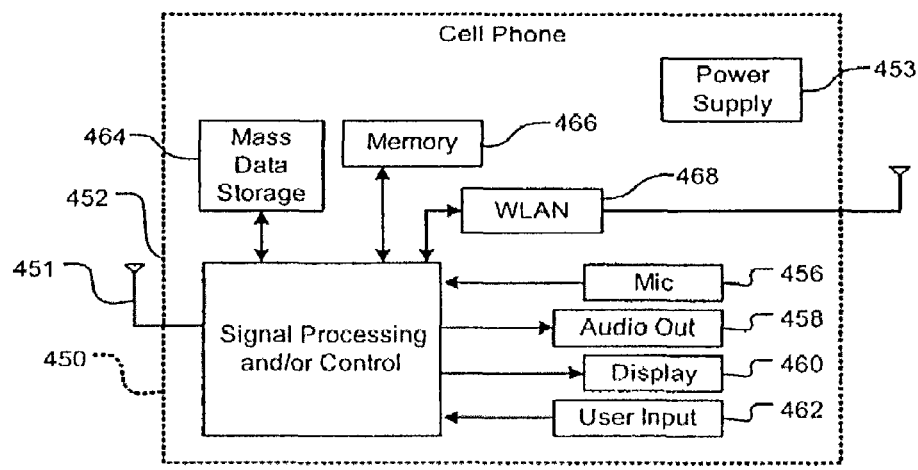
FIG. 13E is a functional block diagram of a cellular phone.

Referring now to FIG. 13E, the present invention can be implemented in a cellular phone 450 that may include a cellular antenna 451. The present invention may be implemented in the mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner on magnetic storage devices such as hard disk drives HDD. At least one HDD may have the configuration shown in FIG. 13A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 13F:
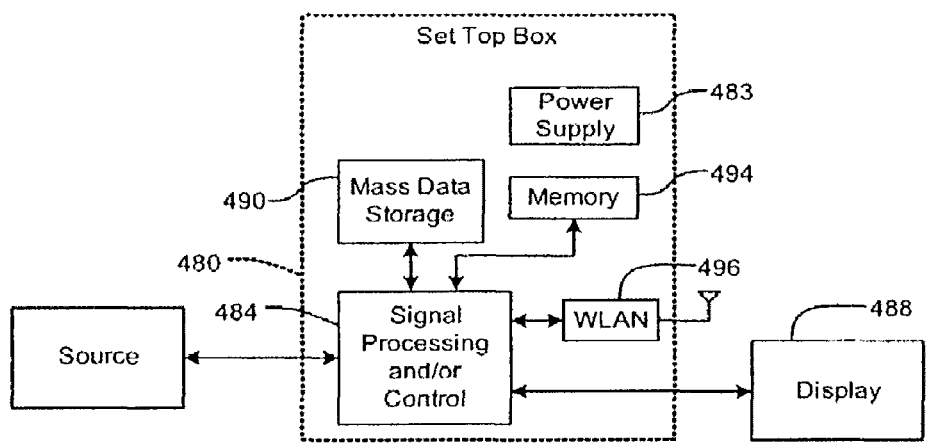
FIG. 13F is a functional block diagram of a set top box.

Referring now to FIG. 13F, the present invention can be implemented in a set top box 480. The present invention be implemented in the mass data storage of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with the mass data storage 490 that stores data in a nonvolatile manner. The mass data storage 490 may include magnetic storage devices for example hard disk drives HDD. At least one HDD may have the configuration shown in FIG. 13A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 13G:
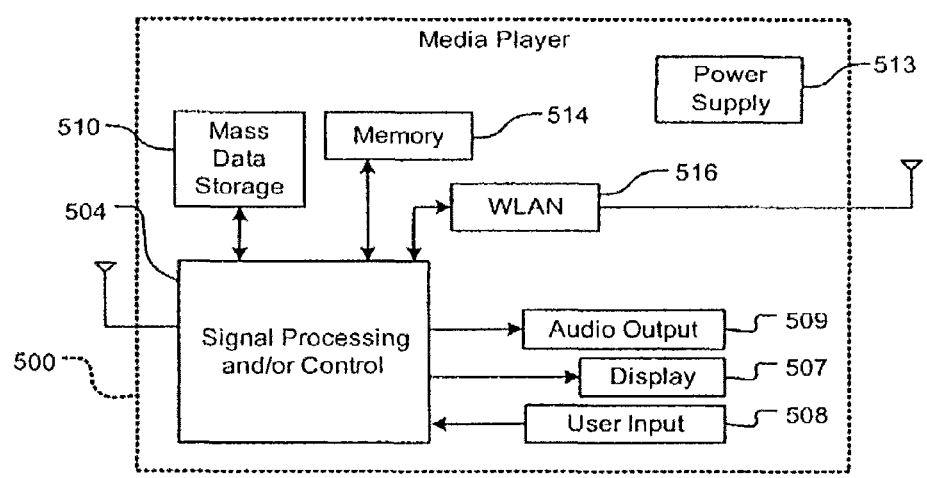
FIG. 13G is a functional block diagram of a media player.

Referring now to FIG. 13G, the present invention can be implemented in a media player 500. The present invention may be implemented in a mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include magnetic storage devices for example hard disk drives HDD. At least one HDD may have the configuration shown in FIG. 13A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516.

It is intended that the foregoing detailed description be understood as an illustration of selected forms that the invention can take and not as a definition of the invention. It is only the following claims, including all equivalents, that are intended to define the scope of this invention.

What is claimed is:

1. A data storage system comprising:
a processor configured to:
determine an estimated error in a first write time of a first binary transition written to a storage medium, the estimated error being an estimate of error caused by magnetic fields of one or more previously written transitions;
compare the estimated error with an actual error in the first write time;
adjust an adjustable estimate value based on the comparison; and
compensate for an anticipated error in a second write time of a second binary transition based on the adjusted adjustable estimate value.

2. The data storage system of claim 1, wherein the estimated error is based on a non-linear transition shift in the first write time of the first binary transition caused by the magnetic fields of the one or more previously written transitions.

3. The data storage system of claim 1, wherein the processor is further configured to:
receive a waveform corresponding to a binary sequence written to the storage medium, the first binary transition being within the binary sequence;
identify a bit pattern associated with the binary sequence;
estimate the estimated error based on the bit pattern.

4. The data storage system of claim 3, wherein the processor is further configured to:
determine a segment of the binary sequence based on a predetermined segment length, the bit pattern associated with the binary sequence comprising a bit pattern of the segment; and
estimate the estimated error based on the bit pattern of the segment.

5. The data storage system of claim 4, wherein the segment is centered around the first binary transition.

6. The data storage system of claim 4, wherein the processor is further configured to:
determine an estimated amount of non-linear transition shift for the first binary transition, the estimated non-linear transition shift corresponding to the bit pattern of the segment; and
multiply the amount of the non-linear transition shift for the first binary transition with a discrete-time differentiation of an ideal step response for the first binary transition to estimate the estimated error.

7. The data storage system of claim 3, wherein the bit pattern comprises a first bit pattern associated with the first binary transition, wherein the processor is further configured to:

determine one or more second bit patterns associated with one or more third binary transitions, the one or more third binary transitions being within the binary sequence; and estimate the estimated error based on the first bit pattern and the one or more third bit patterns.

8. The data storage system of claim 1, wherein the processor is configured to compensate for the anticipated error in the second write time through an adjustment of the second write time based on the adjusted adjustable estimate value.

9. The data storage system of claim 1, further comprising a register configured to store a plurality of estimate values to compensate for one or more write-time errors in binary transitions written to the storage medium, the plurality of estimate values comprising the adjustable estimate value and at least one fixed estimate value.

10. A method of compensating for write time errors, the method comprising:

determining, with at least one processor, an estimated error in a first write time of a first binary transition written to a storage medium, the error being caused by magnetic fields of one or more previously written transitions;

comparing the estimated error with an actual error in the first write time;

adjusting, with the at least one processor, an adjustable estimate value based on the comparison; and compensating, with the at least one processor, for an anticipated error in a second write time of a second binary transition based on the adjusted adjustable estimate value.

11. The method of claim 10, wherein the estimated error is based on a non-linear transition shift in the first write time of the first binary transition caused by the magnetic fields of the one or more previously written transitions.

12. The method of claim 10, further comprising:

receiving, with the at least one processor, a waveform corresponding to a binary sequence written to the storage medium, the first binary transition being within the binary sequence;

identifying, with the at least one processor, a bit pattern associated with the binary sequence; and estimating, with the at least one processor, the estimated error based on the bit pattern.

13. The method of claim 12, further comprising:

determining, with the at least one processor, a segment of the binary sequence based on a predetermined segment length, the bit pattern associated with the binary sequence comprising a bit pattern of the segment; and estimating, with the at least one processor, the estimated error based on the bit pattern of the segment.

14. The method of claim 13, wherein the segment is centered around the first binary transition.

15. The method of claim 13, further comprising:

determining, with the at least one processor, an estimated amount of non-linear transition shift for the first binary transition, the estimated non-linear transition shift corresponding to the bit pattern of the segment; and multiplying, with the at least one processor, the amount of the non-linear transition shift for the first binary transition with a discrete-time differentiation of an ideal step response for the first binary transition to estimate the estimated error.

16. The method of claim 12, wherein the bit pattern comprises a first bit pattern associated with the first binary transition, the method further comprising:

determining, with the at least one processor, one or more second bit patterns associated with one or more third binary transitions, the one or more third binary transitions being within the binary sequence; and estimating, with the at least one processor, the estimated error based on the first bit pattern and the one or more third bit patterns.

17. The method of claim 10, wherein compensating for the anticipated error in the second write time comprises compensating, with the at least one processor, for the anticipated error in the second write time through an adjustment of the second write time based on the adjusted adjustable estimate value.

18. The method of claim 10, further comprising:

storing, with a register, a plurality of estimate values to compensate for one or more write-time errors in binary transitions written to the storage medium, the plurality of estimate values comprising the adjustable estimate value and at least one fixed estimate value.

* * * * *